United States Patent

[11] 3,578,855

[72] Inventor Angelo Boudouris
 Sylvania, Ohio
[21] Appl. No. 801,010
[22] Filed Feb. 20, 1969
[45] Patented May 18, 1971
[73] Assignee Eprad Incorporated
 Toledo, Ohio

[54] PROJECTOR FRAME CONTROL
 4 Claims, 7 Drawing Figs.
[52] U.S. Cl. ................................................ 352/163,
 74/56
[51] Int. Cl. ................................................ G03b 21/46
[50] Field of Search ................................................ 352/163,
 164; 74/107, 99; 74/56

[56] References Cited
 UNITED STATES PATENTS
2,037,454 4/1936 Boecking .................... 352/163

2,458,346 1/1949 Charlin ...................... 352/163
 FOREIGN PATENTS
 22,109 12/1907 Great Britain ............... 352/163
143,034 5/1920 Great Britain ............... 352/163
148,924 4/1922 Great Britain ............... 352/163

Primary Examiner—Louis R. Prince
Assistant Examiner—Denis E. Corr
Attorney—Owen and Owen ABSTRACT: A frame control device for aligning frames on film with a projection lens. A control sleeve is coaxially mounted for limited movement on a driven axle and a film drive sprocket is coaxially mounted on the sleeve for limited movement of the sleeve with respect to the sprocket. Thrust bearings prevent axial movement of the axle and the film sprocket. The sleeve is keyed to the axle and the sprocket such that the phase relationship between the sprocket and the axle may be adjusted by changing the axial position of the sleeve on the axle, thereby aligning the film frame with the lens.

PATENTED MAY 18 1971                   3,578,855
SHEET 1 OF 2
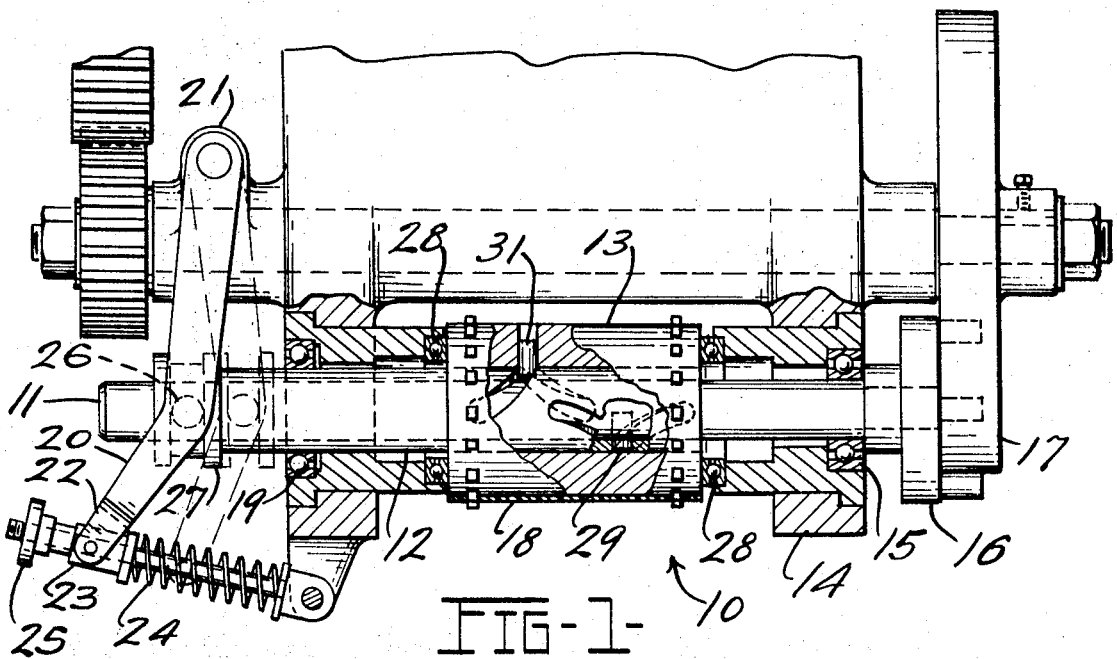
FIG-1-
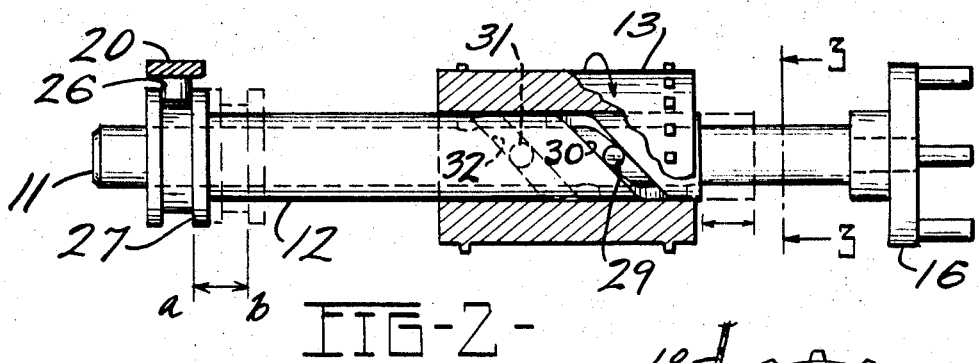
FIG-2-
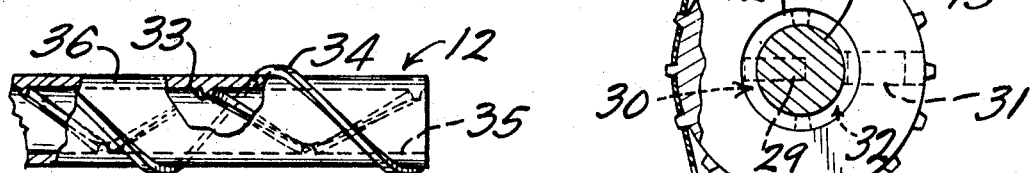
FIG-5-
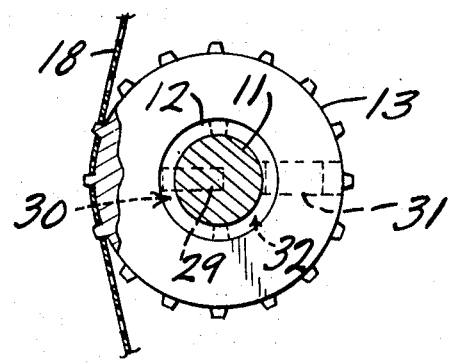
FIG-3-
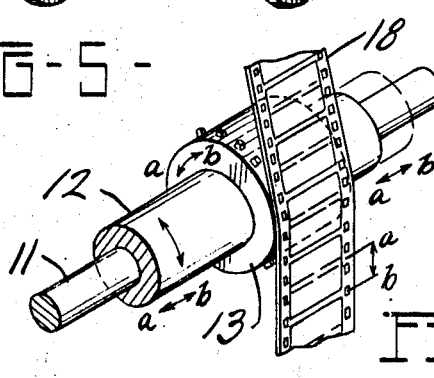
FIG-4-
INVENTOR:
ANGELO BOUDOURIS.
BY
ATT'YS.

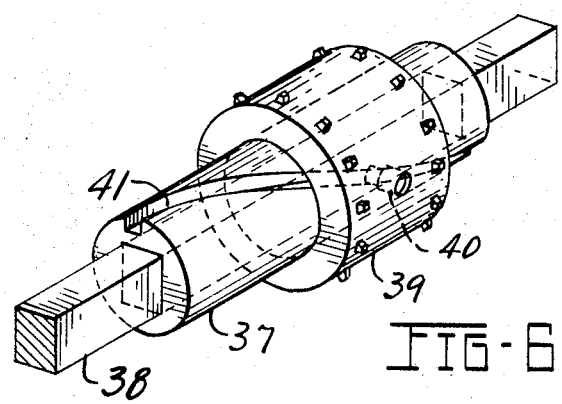
FIG-6-
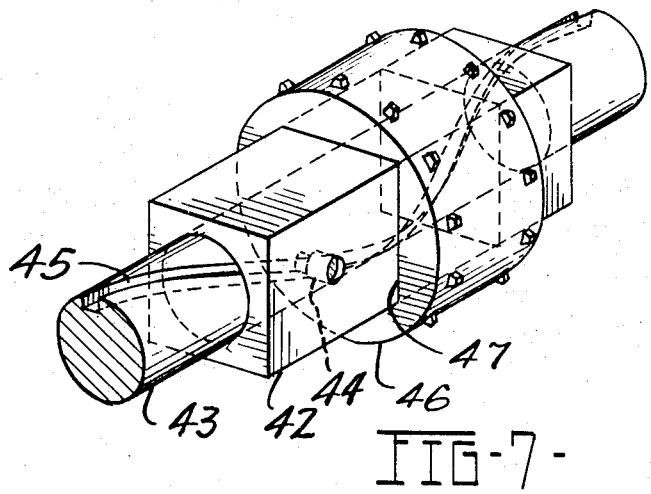
FIG-7-
INVENTOR:
ANGELO BOUDOURIS.
BY
ATT'YS.

PROJECTOR FRAME CONTROL

BACKGROUND OF THE INVENTION

This invention relates generally to motion picture projectors and, more particularly, to an improved frame control device for aligning frames on film with a projection lens system.

Modern motion picture projectors generally comprise film supply and takeup reels, a projection lens and lamp, a shutter, and a film drive system. The film typically runs from the supply reel, over a constant speed drive sprocket, and into a slack loop. An intermittently driven sprocket rapidly draws the film, one frame at a time, from the slack loop to a projecting position while the shutter is closed, and the film remains stationary for a fractional part of a second while the shutter is opened to expose the picture on the screen. The film is then fed from the intermittently driven sprocket through a second slack loop and a second constant speed sprocket to the takeup reel.

One problem in constructing conventional motion picture projectors occurs in aligning the film frame with the shutter and projection lens. Film is usually manufactured with four sprocket holes on each side of each frame, while the intermittently driven sprocket is constructed with 16 teeth spaced around each side to cooperate with the holes in the film. The sprocket is rotated one quarter revolution by a Geneva drive mechanism each time a new frame is to be drawn into the projecting position. When the film is initially placed in the projector, the probability of positioning the sprocket teeth in the proper film holes is only one in four. It is therefore necessary to provide a device for positioning the frames with respect to the projection lens. This problem has usually been solved by mounting either the intermittently driven sprocket or the entire film drive system on a carriage which is movable with respect to the shutter and the projection lens. Each time a film is placed in the projector and the frame is misaligned, the carriage is manually repositioned, usually by a rack and pinion gear arrangement. This frame positioning method requires a large and relatively complicated drive mechanism since the shutter must be synchronized with the intermittently driven sprocket.

In a solution recently suggested by at least one manufacturer, the intermittently driven sprocket is attached to a drive shaft, which has a helically splined portion. The sprocket is rotated to change the position of the frame with respect to the projection lens by changing the axial position at which a drive gear engages the helically splined portion of the shaft. This solution however requires a relatively large space and a number of expensive precision gears to permit positioning of the drive gear.

SUMMARY OF THE INVENTION

According to the instant invention, a Geneva gear drive mechanism is mounted to rotate an axle in one quarter revolution increments. A tubular control sleeve is mounted coaxially on the axle and the film drive sprocket is mounted coaxially on the sleeve. Thrust bearings restrain the axle and the film drive sprocket from axial movement, while the tubular sleeve is mounted to move axially with respect to the axle and the film drive sprocket. The tubular sleeve is either keyed or splined to engage both the axle and the film drive sprocket such that, when the sleeve is moved axially with respect to the axle and the sprocket, the sprocket rotates with respect to the axle. When the tubular sleeve is restrained from axial movement, the sleeve and the sprocket are intermittently driven with the axle. A control knob is connected to the sleeve through a fork, a lever, or other suitable device for axially positioning the tubular sleeve, while permitting the sleeve to rotate with the axle. Thus, by turning the control knob the sleeve is axially positioned, to rotate the film drive sprocket with respect to the axle, thereby positioning the film frame with respect to the projection lens.

It is therefore a primary object of this invention to provide an improved frame control device for aligning a film frame with the projection lens in a motion picture projector.

Other objects and advantages of the invention will become apparent from the following detailed description, reference being made to the accompanying drawings.

BRIEF DESCRIPTION OF THE DRAWINGS

FIG. 1 is a partial cross-sectional view showing the intermittent film drive portion of a motion picture projector constructed in accordance with the present invention;

FIG. 2 is a partially sectioned view of a film frame control device constructed in accordance with the instant invention;

FIG. 3 is a cross-sectional view taken along lines 3–3 of FIG. 2;

FIG. 4 is a perspective view of a film frame control device according to the instant invention;

FIG. 5 is a partially sectioned view of a modified form of the tubular control sleeve;

FIG. 6 is a perspective view of a modified embodiment of a film frame control device according to the instant invention; and FIG. 7 is a perspective view of a modified embodiment of a film frame control device according to the instant invention.

DESCRIPTION OF THE PREFERRED EMBODIMENTS

Referring now to FIGS. 1—3, one embodiment of the film frame control device 10 is shown. The film frame control device 10 generally comprises an axle 11, a tubular control sleeve 12 and a film drive sprocket 13. The axle 11 is mounted in a projector housing 14 adjacent to a shutter and a projection lens system (not shown) to rotate on a bearing 15. The bearing 15 serves as a thrust bearing which permits the axle 11 to rotate freely, while restraining the axle 11 from axial movement. A follower 16 is attached to one end of the axle 11 for engaging a Geneva gear drive mechanism 17. The Geneva gear drive mechanism 17, which is driven at a constant speed, is designed to intermittently rotate the axle 11 by one quarter revolution increments in synchronism with a shutter. Each time the axle 11 is rotated one quarter revolution, the film drive sprocket 13 is also rotated one quarter revolution to advance a film 18 by one frame.

The tubular control sleeve 12 is mounted coaxially on the axle 11. A bearing 19 is mounted to give the tubular control sleeve 12 freedom of both axial and rotational movement. A lever 20 is mounted to axially position the control sleeve 12, while permitting the sleeve 12 to rotate freely. One end 21 of the lever 20 is pivotally attached to the projector housing 14 and the other end 22 of the lever 20 is pivotally attached to a collar 23. The collar 23 is inserted on a threaded screw 24, which has one end attached to the projector housing 14, and is biased against an adjustment nut 25 which is threaded onto the screw 24. A follower 26 is attached to the lever 20 to fit into a grooved collar 27 on the tubular control sleeve 12. When the adjustment nut 25 is tightened, the lever 20 is pivoted to the right, causing the follower 26 to move the sleeve 12 to the right. Similarly, when the adjustment nut 25 is loosened, the lever 20 is pivoted to the left and the follower 26 simultaneously moves the sleeve 12 to the left. It will be clear to those skilled in the art that the lever 20 may be replaced by other means for axially positioning the control sleeve 12.

The film drive sprocket 13 is mounted coaxially on the control sleeve 12 to rotate with the control sleeve 12 and the axle 11, when the follower 16 is driven by the Geneva gear 17. A pair of thrust bearings 28 restrain the film sprocket 13 from axial movement, while permitting rotational movement. A pin 29 extends from the axle 11 into a cooperating groove 30 in the sleeve 12 such that the sleeve 12 is rotated with the axle 11. A pin 31 similarly extends from the sprocket 13 into a cooperating groove 32 in the sleeve 12 such that the sprocket 13 is rotated with the sleeve 12 and the axle 11. The two grooves 30 and 32 in the sleeve 12 are formed such that, if they were extended, they would intersect. The grooves 30 and 32 thus form, in effect, a wedge which is moved between the pin 29 on the axle 11 and the pin 31 on the sprocket 13 when the control sleeve 12 is moved axially. Thus, when the sleeve 12 is moved axially, the sleeve 12 describes helical movement with respect to both the axle 11 and the sprocket 13 and the sprocket 13 is rotated with respect to the axle 11. The relative movement between the axle 11, the sleeve 12, the sprocket 13 and the film 18 is shown in FIG. 4. As the sleeve 12 is moved from a to b, the sprocket 13 is rotated from a to b to move the film 18 from a to b. The angle of the grooves 30 and 32 in the sleeve 12 are selected such that when the sleeve 12 is moved between two extreme axial positions, the film 18 will be moved, with respect to the projection lens, by at least one full frame.

Referring now to FIG. 5, a modification of the tubular control sleeve 12 is shown. The grooves 30 and 32 in the sleeve 12 have been replaced with two oppositely wound helical splines 33 and 34. The helical spline 33 is formed along the axial opening 35 which extends through the tubular sleeve 12 for engaging a cooperating spline (not shown) which is formed in the axle 11. The helical spline 34 is formed along the outer surface 36 of the sleeve 12 for engaging a cooperating spline (not shown) in the sprocket 13. The splines 33 and 34 operate in a manner similar to that of the pins 29 and 31 and the grooves 30 and 32, while providing a greater contact area for reduced wear. Although only a single spline 33 is shown in the opening 35 and a single spline 34 is shown on the outer surface 36, any number of similar splines may be spaced around the opening 35 and the outer surface 36.

Two modified embodiments of the frame control device are shown in FIGS. 6 and 7. In FIG. 6 a control sleeve 37 is mounted coaxially on a square portion of a driven axle 38 such that the sleeve 37 is rotated with the axle 38 and is restricted to axial movement on the axle 38. A film drive sprocket 39 is coaxially mounted on the control sleeve 37 and includes a pin follower 40 which rides in a helical groove 41 in the outer surface of the sleeve 37. As in the previous embodiments, thrust bearings (not shown) restrain the axle 38 and the sprocket 39 from axial movement. Thus, when the sleeve 37 is moved axially along the axle 38, the sprocket 39 is rotated with respect to the axle 38 and the sleeve 37.

In the embodiment shown in FIG. 7, a control sleeve 42 having a square cross section is coaxially mounted on a driven axle 43. A pin follower 44 extends from the square sleeve 42 into a helical groove 45 cut into the axle 43. A film drive sprocket 46 has a square opening 47 adapted to fit coaxially on the square sleeve 42, such that the sleeve 42 can move axially with respect to the sprocket 46 but is prevented from rotational movement with respect to the sprocket 46. Again, thrust bearings (not shown) restrain the axle 43 and the sprocket 46 from axial movement. Thus, when the sleeve 42 is moved axially with respect to the axle 43 and the sprocket 46, the sleeve 42 and the sprocket 46 rotate with respect to the axle 43.

It will be apparent that the film frame control device 10 may be adapted to fit other types of projectors, such as filmstrip projectors, and that various other changes and modifications may be made without departing from the scope of the appended claims.

I claim:

1. An improved frame control device for aligning a film frame with a projection lens comprising, in combination, an axle, means for driving said axle, a tubular sleeve coaxially mounted on said axle, means for connecting said sleeve to said axle for limited helical movement of said sleeve with respect to said axle, a film drive sprocket coaxially mounted on said sleeve, means for connecting said sprocket to said sleeve for limited helical movement of said sleeve with respect to said sprocket, first thrust bearing means for restraining axial movement of said axle, second thrust bearing means for restraining axial movement of said sprocket, and means for controlling the axial position of said sleeve with respect to said axle and said sprocket, whereby, when said sleeve is restrained from axial movement, said sleeve and said sprocket are driven with said axle and, when said sleeve is moved axially between first and second positions, said sprocket is rotated with respect to said axle.

2. An improved frame control device for aligning a film frame with a projection lens, as defined in claim 1, wherein said sleeve has first and second oppositely winding helical grooves, wherein said means for connecting said sleeve to said axle for limited helical movement includes pin means attached to said axle to ride in said first helical groove in said sleeve, and wherein said means for connecting said sprocket to said sleeve for limited helical movement between said sleeve and said sprocket includes second pin means attached to said sprocket to ride in said second helical groove in said sleeve.

3. An improved frame control device for aligning a film frame with a projection lens comprising, in combination, an axle, said axle having a helically splined portion, means for driving said axle, first thrust bearing means for restraining said axle from axial movement, a tubular sleeve coaxially mounted on said axle, said sleeve having helical splines for cooperatively engaging said helically splined portion of said axle, said sleeve further having a helically splined outer surface, the splines on said helically splined outer surface winding about the sleeve axis in a direction opposite to said helical splines which engage said axle, a film sprocket coaxially mounted on said sleeve, said sprocket having helical splines for cooperatively engaging said helically splined outer surface of said sleeve, second thrust bearing means for restraining said sprocket from axial movement, and means for controlling the axial position of said sleeve with respect to said axle and said sprocket, whereby, when said sleeve is restrained from axial movement, said sleeve and said sprocket are driven with said axle and, when said sleeve is moved axially with respect to said axle and said sprocket, said sprocket is rotated with respect to said axle.

4. An improved frame control device for aligning a film frame with a projection lens comprising, in combination, an axle, first thrust bearing means for restraining said axle from axial movement, means for driving said axle, a tubular sleeve coaxially mounted on said axle, means for connecting said sleeve to said axle for axial movement of said sleeve with respect to said axle and effective to prevent rotational movement of said sleeve with respect to said axle, a film drive sprocket coaxially mounted on said sleeve, second thrust bearing means for restraining said sprocket from axial movement, means for connecting said sprocket to said sleeve for limited helical movement between said sleeve and said sprocket, and means for controlling the axial position of said sleeve with respect to said axle and said sprocket, whereby, when said sleeve is restrained from axial movement, said sleeve and said sprocket are driven with said axle and, when said sleeve is moved axially with respect to said axle and said sprocket, said sprocket is rotated with respect to said axle.